(No Model.)

A. BURKHARD.
TWO WHEELED VEHICLE.

No. 275,133. Patented Apr. 3, 1883.

WITNESSES:
James T. Tobin
David S. Williams

INVENTOR:
Adam Burkhard
by his Attorneys
Howson and Son

United States Patent Office.

ADAM BURKHARD, OF PHILADELPHIA, PENNSYLVANIA.

TWO-WHEELED VEHICLE.

SPECIFICATION forming part of Letters Patent No. 275,133, dated April 3, 1883.

Application filed August 28, 1882. (No model.)

*To all whom it may concern:*

Be it known that I, ADAM BURKHARD, a citizen of the United States, and a resident of Philadelphia, Pennsylvania, have invented certain Improvements in Vehicles, of which the following is a specification.

The object of my invention is to construct a two-wheeled vehicle in such a manner that entrance to or exit from the same on either side and in front of the wheels can be readily effected, and so that the vehicle can be rendered more compact and the weight of the load more advantageously distributed than in vehicles of this class as usually constructed.

Figure 1:
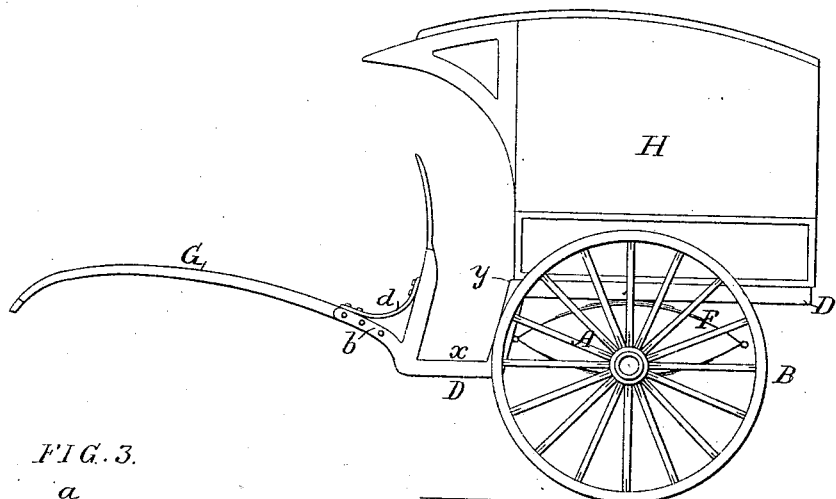
Figure 3:
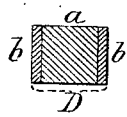
Figure 2:
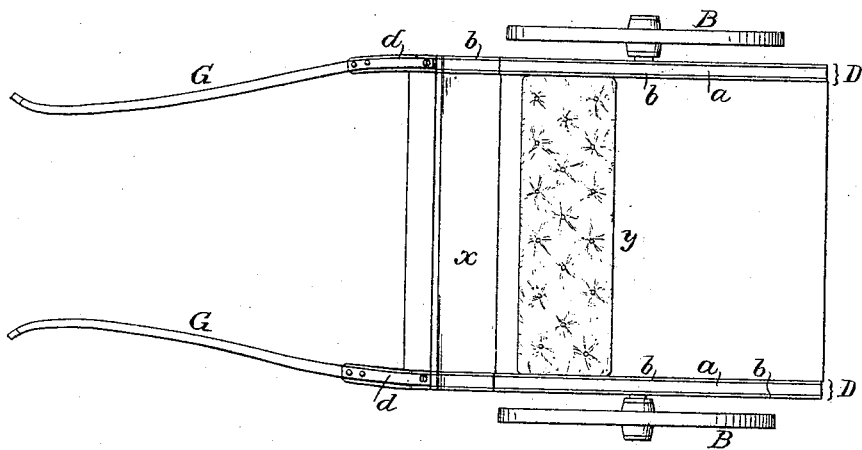

In the accompanying drawings, Figure 1 is a side view of my improved vehicle; Fig. 2, a plan view of the same without the hood; and Fig. 3, an enlarged transverse section of one of the side frames.

The vehicle has a single axle, A, with two wheels, B, and the opposite side frames, D, of the vehicle are supported upon springs F, secured to said frames and to the axle. Elliptical springs are shown in the present instance; but the invention is not limited to the use of such springs.

Two-wheeled vehicles of this class are becoming popular in cities for the delivery of parcels or packages and light merchandise generally. As usually constructed, however, the side frames of such vehicles are straight, and in consequence the floor is so high that steps are required in order to permit entrance to or exit from the vehicle.

In my improved vehicle the side frames, D, are each depressed at and near the front end, so as to facilitate entrance to or exit from the vehicle without the use of the usual steps, the floor $x$ of the front portion of the vehicle, owing to this depression of the frames, being so close to the ground as to be within easy stepping distance above the street-curb.

Each frame D is composed preferably of a central bar, $a$, of wood, having a strip, $b$, of wrought-iron or steel, on one or both sides for the purpose of imparting proper rigidity to the frame, and the shafts G of the vehicle form rigid continuations of the side frames, D, the plates $b$ projecting beyond said frames, so as to provide a means of attachment for the shafts, which attachment is re-enforced by the braces $d$.

Besides the facility of ingress and egress which is afforded by the depression of the frames D, the body H of the vehicle can be made lower than usual, as the driver's seat can be placed directly upon the floor $y$, and the weight is thus brought closer to the axle than in an ordinary vehicle of this class.

The space for the carriage of goods is in the rear of the axle, so that the weight of said goods serves to balance or partially balance the weight of the driver, whose seat is in front of the axle.

I do not claim, broadly, a two-wheeled vehicle the side frames of which are depressed in front of the axle, as Hansom cabs are thus constructed; but

I claim as my invention—

A two-wheeled vehicle having a driver's seat in advance of the axle and a space for the carriage of goods in the rear of said axle, and having the side frames depressed in front of the axle, so as to lower the floor $x$, as set forth.

In testimony whereof I have signed my name to this specification in the presence of two subscribing witnesses.

ADAM BURKHARD.

Witnesses:
 HARRY DRURY,
 HARRY SMITH.